July 12, 1949.　　　　S. KAGEN ET AL　　　　2,476,097
APPARATUS FOR APPLYING STRIPES OF ADHESIVE MATERIAL
Filed Feb. 28, 1944
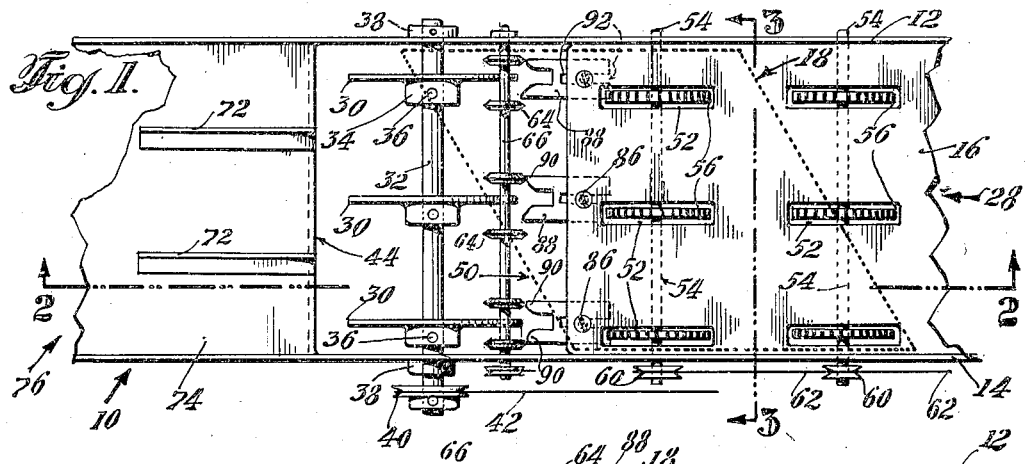
INVENTORS
Simon Kagen
Irving Rothenberg
BY Samuel J. Gurewitz
Att'y. Irving H. Goodyard Patented July 12, 1949

2,476,097

UNITED STATES PATENT OFFICE 2,476,097

APPARATUS FOR APPLYING STRIPES OF ADHESIVE MATERIAL

Simon Kagen, Irving Rothenberg, and Samuel J. Gurewitz, New York, N. Y.; said Gurewitz assignor to said Kagen and said Rothenberg Application February 28, 1944, Serial No. 524,279

4 Claims. (Cl. 91—12)

The present invention relates to an apparatus for coating a cementitious material in selected form and arrangement on a facing which is to be used in the fabrication of a unit from which shoulder pad blanks are to be formed and with the facing produced therewith.

In our co-pending application for an Apparatus for and method of fabricating a shoulder pad blank, filed concurrently herewith, Ser. No. 524,278, and now Patent No. 2,389,934, and application Ser. No. 625,936, filed October 31, 1945, which is a division thereof, the fabricated unit concerned therewith and from which complemental shoulder pad blanks are formed comprises a filler interspaced between two facings, one of which has arranged thereon a coating of cementitious material such as a glue or an adhesive by means of which the coated facing is secured to the other facing.

The present invention is concerned with an apparatus that may be used to coat a facing that may be fabricated by the apparatus and with the method described by us in that co-pending application.

Other objects, advantages and uses of the present invention will be clear from the following description and the drawing appended thereto, in which drawing Fig. 1 is a plan view of an apparatus according to our invention, partially broken away to condense the drawing;

Fig. 2 is a section on the line 2—2 of Fig. 1;

Fig. 3 is a section on the line 3—3 of Fig. 1; and

Fig. 4 is a plan view of a facing coated with cementitious material such as a glue or an adhesive with the said apparatus.

Referring now to the drawing, in the housing 10 between the sides 12 and 14 thereof, we support the feeding platform 16, above which the sides extend to form guides for the facing 18 as it is fed through the apparatus to form thereon the coatings of glue or other adhesive in the arrangement and form contemplated.

It will be understood that the facing 18 which is used in fabricating the unit is of fixed selected dimensions and therefore the sides or guides 14 are spaced apart to correspond in dimension to and accommodate such a facing which is to be fed through the apparatus.

As pointed out in our said co-pending application, the facing 18 that is used with said apparatus is preferably rectangular or square in shape so that when it is severed along the diagonal 20 (Fig. 4), complemental halves 22 and 24 of equal size and shape will be thereby formed.

It is desired, as stated in said co-pending application, to provide a cementitious coating on the overlapping edges 26 and 27 around the periphery of the inside expanse of the facing which is to cover the filler of the fabricated unit from which the complemental shoulder pad blanks are to be formed, so that the cementitious coating will surround the filler at the periphery thereof.

In operation, the facing 18 is fed onto the platform 16 at the entrance to the apparatus, generally indicated by the reference character 28, and is fed onto the coating means, illustrated by the rotated wheels 30, secured to the shaft 32, as by the collars 34 and set screws 36.

The shaft 32 is secured in the sides 12 and 14 and held therebetween, as by collars 38, above the container 44 and is driven by the pulley 40 and belt 42 connected to a motor drive (not shown) to cause rotation of the glueing wheels 30 in the container 44, in which a suitable cement, glue or adhesive 46 is carried. It will of course be understood that the shaft 32 and the wheels 30 carried thereby are positioned above the container 44 so that the wheels 30 will not be completely immersed in the cementitious material 46 as they are rotated by the shaft.

The facing 18, if desired, as it is fed on the platform, may be held away therefrom by any suitable means such as spring wires, which may be seated in the platform. For reasons that will become apparent from the description, the facing 18 is first fed into the apparatus between the sides 12 and 14 with the edge 50 leading.

Extending upwardly a short distance from the platform, through the spaced slots 52, we provide preferably a double feeding means for the facing, comprising spaced parallel driven shafts 54 on each of which are secured a plurality of spaced ratchet wheels 56. For reasons that will also be more apparent from the further description, the ratchet type wheels 56 are not arranged in linear alignment with the coating wheels 30.

We have found that a comparatively fine pointed tooth 58 on the ratchet type wheel serves to very satisfactorily engage the coarsely woven material constituting the conventional facing 18, preferably used in the fabrication of the shoulder pad blank concerned herewith.

Each shaft 54 is driven through the pulley 60 connected thereto by means of the belt 62 connected to a motor drive (not shown).

In order to direct and hold facing 18 against the perimeters of the wheels 30 so that it will be satisfactorily coated thereby, the ratchet type wheels 56 feed the facing 18 under the rollers 64, secured to the shaft 66 fixed for rotation in the sides 12 and 14.

A roller 64 preferably is positioned on each side of a coating wheel 30. Each roller is positioned relatively to the corresponding coating wheel with its lower peripheral surface at a level lower than that of the upper peripheral surface of the coating wheel so that the facing, as it is fed, positively bears against the perimeter of the coating wheel 30.

This insures that the cement, glue or adhesive, which adheres to the perimeter of the wheel 30 as it is rotated into and out of the cementitious material 46 in the container 44 will be adequately and uniformly coated on the facing.

The outer coating wheels 30 adjacent the sides 12 and 14 form the lines of coating 68 on the overlapping edges 26 when the leading edge 50 is fed through the apparatus. It will be recognized that the width of the lines of coating will correspond to the thickness of the wheel perimeters and can be selected accordingly.

We preferably provide a third intermediate coating wheel 30, spaced between the wheels adjacent the sides of the apparatus so that a central line of coating 70 is concurrently formed on the facing, for the purposes which we shall hereinafter describe.

As the thus coated facing is fed from the coating wheels 30 it rides on the members 72 extending up from and along the apron 74 at the exit to the apparatus, generally indicated by the reference character 76.

These fingers, which are preferably positioned between a pair of adjacent coating wheels, hold the coated portions of the facing from contact with the apron, so that the apron will not be smeared with the cement, glue or adhesive and the coating thereby damaged. These fingers further enable the operator of the apparatus to pick up the coated facing for the next operation.

In order to provide the lines of coatings 78 adjacent the two other facing edges 27, upon removing the facing now coated with the lines 68 and 70, it is again fed into the apparatus with the edge 82 leading.

The side coating wheels 30 now coat the facing with the lines 78 of cement, glue or adhesive and the intermediate wheel now coats it with the intermediate line 84.

During this operation the ratchet type wheels 56 not only feed the coated facing through the apparatus but concurrently hold it away from the platform 16 so that the coatings will not be disturbed, the fine teeth 58 of the ratchet type wheels having relatively little effect on the now transversely positioned coatings 68 and 70.

The fingers 72, it will also be understood, hold the completely coated facing from the apron and also enable the operator of the apparatus to pick up the finished coated facing and place it face upward for use by the operator of the apparatus described in our co-pending application.

While a facing with only coatings 68 and 78 on the overlapping edges 26 and 27 of the facing can be satisfactorily secured to the under facing with the filler there-between, since the fabricated unit is cut along the diagonal line 20, the filler in the resulting complemental shoulder pads would not be securely held because it would not be anywhere cemented or sewed to a facing.

By providing the intersecting, intermediate lines of coating 70 and 84, we provide a facing which will always be secured to the filler at its central thickened part, so that after the fabricated unit is cut to form the complemental shoulder pad blanks, the filler will be held therein by the intersecting coating lines 70 and 84, which extends from or adjacent the diagonal to or adjacent the coatings on adjoining edges of the facing.

Due to the thickness of the glue or adhesive, temperature thereof or from other causes, the coating wheels 30 may pick up and carry too much of the glue or adhesive 46 for satisfactory coating operation.

In order to provide a wiper means, we secure the arms 88 to the platform 16 at the edge thereof adjacent the container 44 by means of the set screws 86.

The arms 88 are slotted at their center to provide the wiper fingers 90 at each side of a coating wheel 30.

The set screws 86 extend through the longitudinal slots 92 at the rear of the arms 88 so that they may be advanced toward the adjacent wheel 30, the wheel entering into the slot between the fingers 90, which are thereby positioned closer to the wheel so that they may scrape or wipe off excess glue or adhesive.

It will of course be understood that by spacing the wheels 30 at the sides of the apparatus a proper interval apart corresponding to the guiding sides of the apparatus and the width of the facing fed through the apparatus, the lines of coating on the facing will be made to correspond to the dimensions of the facing and filler to be used in the fabricated unit.

It will now be apparent that we have provided an apparatus by means of which facings to be used in a fabricating apparatus, such as described in our co-pending application, may be quickly and relatively inexpensively coated with a satisfactory glue or adhesive, the width of which coating may be selected and controlled by the width of the means used in the apparatus concerned with here.

It will be further apparent that we have provided a facing so coated that there is provided therewith a shoulder pad blank, the filler of which will always be held therein against accidental removal therefrom.

We claim:

1. In an apparatus of the character described, a container for a cementitious material, a plurality of coating wheels supported for rotation in the container, a roller on each side of a wheel and positioned in advance thereof, the lower peripheral surface of the rollers positioned at a level lower than the upper peripheral surface of the coating wheels, slotted wiping fingers arranged for selective positioning adjacent a wheel on the sides thereof, a feeding platform having a plurality of spaced slots therein, means for feeding a facing through the apparatus comprising a ratchet type wheel having relatively pointed teeth, each ratchet type wheel in line or alignment with a coating wheel extending through each slot and above the platform, an apron at the rear of the wheels and members on the apron and thereabove in misalignment with the wheels.

2. In an apparatus for forming on a facing of selected dimensions, cementitious coatings at selected spaced intervals on the facing as it is fed through the apparatus; means at the sides of the apparatus for guiding therethrough a facing of selected dimensions; a feeding platform at the entrance to the apparatus for a facing to be fed therethrough; means on the platform for feeding a facing through the apparatus comprising spaced ratchet type wheels; a container for a cementitious material; a plurality of means, operating in the container, for forming on the facing fed through the apparatus coatings of the cementitious material, said coating means spaced from the guide means and from each other at intervals corresponding to the spaced intervals of the cementitious coating to be formed on a facing fed through the apparatus; means in advance of the coating means for directing and holding a facing fed through the apparatus against the coating means; and an apron at the exit to the apparatus, having means extending therefrom upon which a facing fed through the apparatus rides above the apron.

3. In an apparatus for forming on a facing of selected dimensions cementitious coating at selected spaced intervals on the facing as it is fed through the apparatus, means at the sides of the apparatus for engaging the edges of a facing and guiding it through the apparatus, ratchet type wheels for feeding the facing through the apparatus, said facing positioned on the said ratchet type wheels as it is fed through the apparatus, a container for a bath of liquid cement to be coated in selected widths at spaced intervals on the facing fed through the apparatus, a shaft positioned above the container, rotatable wheels mounted on the shaft and upon rotation dipped into and out of the bath of liquid cement in the container whereby the peripheries of the wheels pick up the liquid cement, said wheels spaced apart in the apparatus at intervals corresponding to the intervals between the coatings to be formed on the facing fed through the apparatus, the facing being fed through the apparatus on the peripheries of the wheels rotating out of the bath of liquid cement in the container, said wheels being of thickness at the peripheries thereof corresponding to the selected width of the coatings to be formed on the facing.

4. The apparatus of claim 3 and including roller means in advance of the said wheels, the lower peripheries of the roller positioned below the upper peripheral surface of the said wheels to direct the facing to be fed through the apparatus against the perimeters of the wheels whereby the liquid cement picked up by the rotation of the wheels on the peripheries thereof is coated on the facing fed through the apparatus.

SIMON KAGEN.
IRVING ROTHENBERG.
SAMUEL J. GUREWITZ.

REFERENCES CITED

The following references are of record in the file of this patent:

UNITED STATES PATENTS

| Number | Name | Date |
| --- | --- | --- |
| 359,441 | Goldman | Mar. 15, 1887 |
| 469,583 | Mooney | Feb. 23, 1892 |
| 622,765 | Goldman | Apr. 11, 1899 |
| 941,530 | McKibbin | Nov. 30, 1909 |
| 1,805,070 | Bates | May 12, 1931 |
| 1,810,223 | Peterson | June 16, 1931 |
| 1,895,117 | Zuck | Jan. 24, 1933 |
| 2,314,051 | Osgood | Mar. 16, 1943 |
| 2,318,697 | Mackenzie | May 11, 1943 |